United States Patent
Monchiero et al.

(10) Patent No.: US 8,396,953 B2
(45) Date of Patent: Mar. 12, 2013

(54) PROCESSING PACKETS USING A VIRTUALIZED DESCRIPTOR QUEUE

(75) Inventors: Matteo Monchiero, Barcelona (ES); Jen Cheng Huang, Atlanta, GA (US); Yoshio Turner, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 12/723,168

(22) Filed: Mar. 12, 2010

(65) Prior Publication Data

US 2011/0225278 A1 Sep. 15, 2011

(51) Int. Cl.
G06F 15/173 (2006.01)
G06F 15/16 (2006.01)

(52) U.S. Cl. .................. 709/223; 709/234; 709/250

(58) Field of Classification Search .................. 709/223, 709/234, 250
See application file for complete search history.

(56) References Cited

U.S. PATENT DOCUMENTS

| | | | |
|---|---|---|---|
| 5,870,627 A * | 2/1999 | O'Toole et al. .................. 710/22 |
| 2006/0069869 A1* | 3/2006 | Lakshmanamurthy et al. .............................. 711/118 |
| 2007/0153818 A1* | 7/2007 | Lakshmanamurthy et al. .............................. 370/412 |
| 2010/0049876 A1* | 2/2010 | Pope et al. .................... 709/250 |
| 2011/0134912 A1* | 6/2011 | Rothman et al. .............. 370/352 |

* cited by examiner

*Primary Examiner* — Lynn Feild
*Assistant Examiner* — Bryan Lee (57) ABSTRACT

In a method for processing packets among at least a first computing device and a second computing device, in which the first computing device is configured to transmit and receive packets through a Network Interface Card (NIC), in the second computing device, descriptors of packets to be one of transmitted and received by the first computing device through a device descriptor queue are received and placed in a virtualized descriptor queue accessible by the second computing device. In addition, the packets associated with the descriptors placed in the virtualized descriptor queue are processed prior to one of transmission and receipt of the packets by the first computing device.

17 Claims, 8 Drawing Sheets

PROCESSING PACKETS USING A VIRTUALIZED DESCRIPTOR QUEUE

CROSS REFERENCE TO RELATED APPLICATION

The present application related to and contains some common subject matter with commonly assigned and U.S. patent application Ser. No. 12/555,552, entitled "Deep Packet Inspection (DPI) Using a DPI Core" by Monchiero et al., filed on Sep. 8, 2009, the disclosure of which is incorporated by reference in its entirety.

BACKGROUND

Data centers are increasingly deploying a growing range of "bump-in-the-wire" services that perform packet processing on behalf of applications. Deep Packet Inspection (DPI) in particular is experiencing growing popularity for services such as, intrusion detection, content insertion, performance monitoring, traffic classification, and flow management. Conventional packet processing services often have strict performance requirements and should be transparent to the operating system (OS) or hypervisor and application software at traffic end-points. Those conventional packet processing services are typically implemented as custom hardware appliances, which become aggregation points in the data center that require careful data center-wide configuration to ensure that all appropriate network or storage traffic is routed correctly to the hardware appliances without first passing through untrusted or otherwise inappropriate devices. As aggregation points, the hardware appliances often require special-purpose acceleration hardware to handle relatively large data and packet rates. The resulting hardware appliances are typically expensive, difficult to scale incrementally, and have inflexible or hardwired functionality.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an example embodiment thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a system and method for processing packets among at least a first computing device and a second computing device, in which the first computing device is configured to transmit and receive packets through a Network Interface Card (MC). In one example embodiment, the first computing device and the second computing device comprise cores of a multicore processor. In other example embodiments as discussed below, the first computing device and the second computing device comprise processors, servers, etc. In the system and method, the second computing device receives descriptors of the packets to be one of transmitted and received by the first computing device through a device descriptor queue accessible by the first computing device. In addition, the second computing device places the received descriptors in a virtualized descriptor queue that is accessible by the second computing device and processes the packets associated with the descriptors placed in the virtualized descriptor queue prior to one of transmission and receipt of the packets by the first computing device. The descriptors of the packets generally comprise pointers or referents to an address in a memory or buffer location that denotes the starting point and size of the memory or buffer location.

According to an example embodiment, the device descriptor queue comprises a descriptor queue pair, one descriptor queue for transmission of packets and one descriptor queue for receipt of packets. Likewise, the virtualized descriptor queue comprises a virtualized descriptor queue pair, one virtualized descriptor queue for transmission of packets and one virtualized descriptor queue for receipt of packets. For purposes of simplicity, the first device descriptor queue pair and the virtualized descriptor queue pair are referenced herein as a device descriptor queue and a virtualized descriptor queue, respectively. In this regard, the "device descriptor queue" discussed herein may represent either or both of the transmission and receipt descriptor queues and the "virtualized descriptor queue" may represent either or both of the virtualized transmission and receipt descriptor queues.

In addition, and as discussed in greater detail herein below, from a perspective of an Operating System (OS) running on the first computing device, it appears that the NIC is using the device descriptor queue to transmit and receive packets. However, the NIC is configured to access the virtualized descriptor queue instead of the device descriptor queue to transmit and receive packets. The virtualized descriptor queue in the second computing device thus provides the illusion to the OS running on the first computing device that NIC is accessing the device descriptor queue.

Through implementation of the system and method disclosed herein, packets may thus be intercepted by the second computing device such that the second computing device, or other computing device may process the packets prior to transmission and/or receipt of the packets by the first computing device. Thus, for instance, the second computing device may process the packets to determine whether to drop, leave unchanged, or modify the packets. In addition, the interception and processing of the packets by the second computing device may be transparent to the first computing device.

Figure 1:
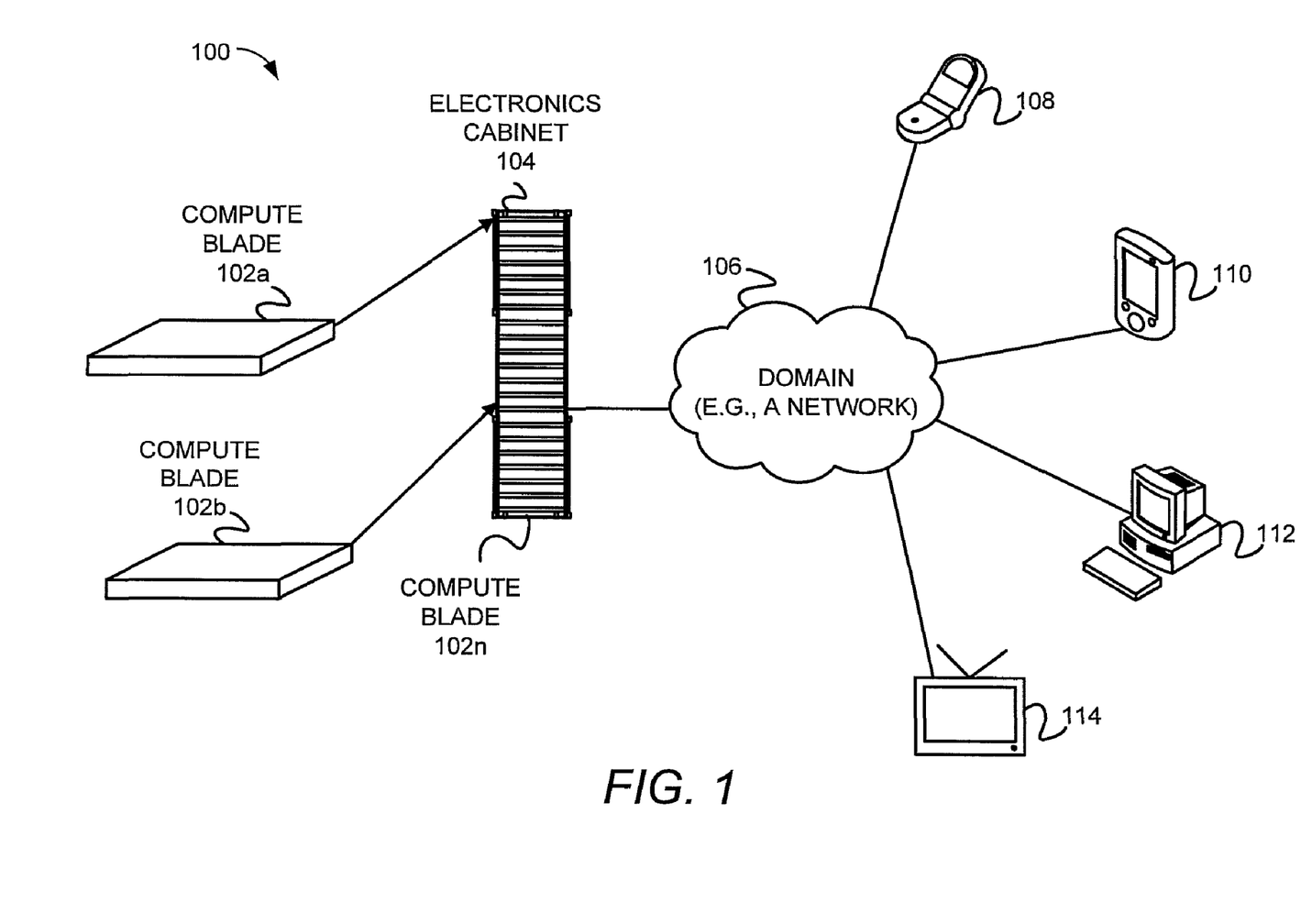
FIG. 1 shows a simplified block diagram of a system, which provides a platform upon which example embodiments disclosed herein may be implemented, according to an example embodiment of the present invention.

With reference first to FIG. 1, there is shown a simplified block diagram of a system 100, which provides a platform upon which example embodiments disclosed herein may be implemented, according to an embodiment. It should be clearly understood that the system 100 may include additional components and that some of the components described herein may be removed and/or modified without departing from a scope of the system 100. As such, the system 100 may include any number of computing devices, CPUs, and memories.

Generally speaking, the system 100 depicted in FIG. 1 shows a number of various environments in which example embodiments of the invention may be employed. More particularly, for instance, the example embodiments of the invention may be employed in a single multi-core processor, multiple processors located in a single computing device, multiple processors/cores located in multiple computing devices, etc.

As shown in FIG. 1, the system 100 includes a plurality of computing systems in the form of a plurality of compute blades 102a-102n. One or more of the compute blades 102a-102n may comprise multiple processors and/or multiple cores. Each of the compute blades 102a-102n is positioned proximate to an electronics cabinet 104 and is operatively connected (logically or physically) to a network 106. The system 100 may also include additional compute blades positioned proximate to one or more additional electronics cabinets. The network 106 may be an intranet, the Internet, a Wide Area Network (WAN), a Local Area Network (LAN), or some other network and suitable topology associated with the network. In some example embodiments, operatively connected to the network 106 are a plurality of devices including, a cellular telephone 108, a Personal Digital Assistant (PDA) 110, a computer system 112, and a television or monitor 114.

Figure 2:
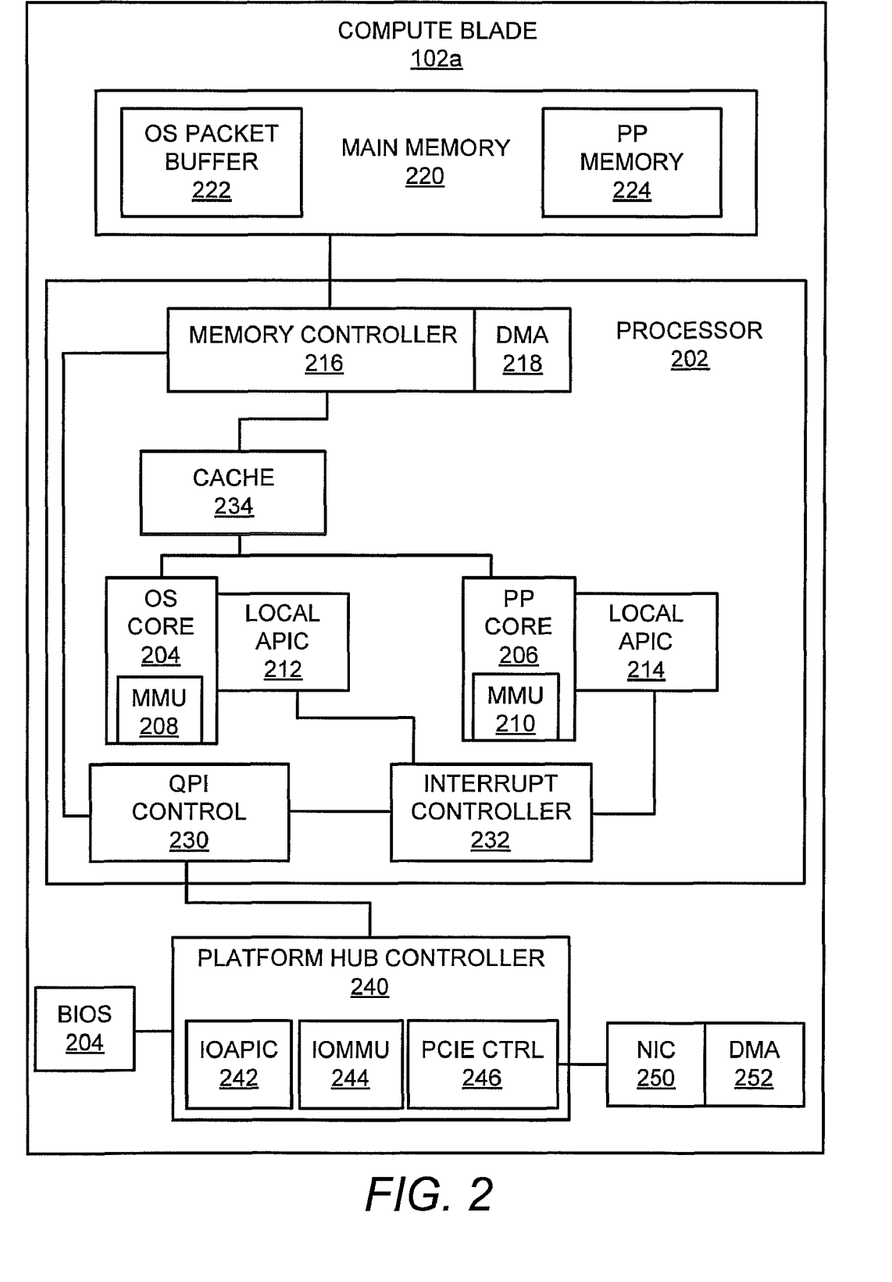
FIG. 2 illustrates a flowchart of a block diagram of a compute blade, which provides a platform upon which example embodiments disclosed herein may be implemented, according to an example embodiment of the present invention.

Turning now to FIG. 2, there is shown a block diagram of a compute blade 102a, which provides a platform upon which example embodiments disclosed herein may be implemented, according to an example. It should be clearly understood that the compute blade 102a may include additional components and that some of the components described herein may be removed and/or modified without departing from a scope of the compute blade 102a.

As shown therein, the example compute blade 102a includes a processor 202, a main memory 220, a platform hub controller 240, and a NIC 250. Although the compute blade 102a has been depicted as including a single processor 202, the compute blade 102a may include any number of processors 202. In addition, although the processor 202 has been depicted as including an Operating System (OS) Core 204 and a Packet Processing (PP) Core 206, the processor 202 may include any number of cores configured to perform functions similar to or different from the OS core 204 and the PP core 206.

The OS core 204 may include an OS (not shown) residing therein, which may comprise a suitable OS, including the LINUX™ operating system, Microsoft Corporation's WINDOWS™ operating system, Sun Corporation's SOLARIS™ operating system, the UNIX operating system, or the like. The PP core 206 may include a packet processing module (not shown) residing therein, which may be configured to perform one or more packet processing operations on packets that are received and/or transmitted by the OS core 204. By way of example, the PP core 206 may include a Deep Packet Inspection (DPI) module configured to process the packets for services such as, intrusion detection, content insertion, performance monitoring, traffic classification, flow management, etc. As another example, the PP core 206 may include one or more other types of modules configured to perform other functions with respect to the packets, such as, dropping, leaving unchanged, and modifying the packets based upon results of the packet processing. As discussed in greater detail herein below, the PP core 206 is configured to employ a mechanism based on the virtualization of the descriptor queues of the OS to intercept the packets for processing prior to transmission and receipt by the OS of the packets.

The main memory 220 has been depicted as including an OS packet buffer 222 and a PP memory 224. The processor 202 also includes an integrated memory controller 216, which operates as an interface to the main memory 220 and is associated with a Direct Memory Access (DMA) module 218. The processor 202 also includes a point-to-point high speed link (QPI Control) 230 that connects to the Platform Hub Controller (PHC) 240. The QPI Control 230 may comprise QPI™ available from Intel Corporation, HYPERTRANSPORT™ available from the AMD Corporation, or the like. The PHC 240 hosts an Interrupt Controller (IOAPIC) 242, an Input Output Memory Management Unit (IOMMU) 244, and a peripheral component interconnect controller (PCIE CTRL) 246.

The OS core 204 and the PP core 206 are equipped with respective Memory Management Units (MMUs) 208, 210. The MMUs 208, 210 generally provide virtual-to-physical translation logic. In addition, the OS core 204 and the PP core 206 are equipped with respective Local Interrupt Controllers (Local APICs) 212, 214. The Local APICs 212, 214 are operatively connected to an interrupt controller 232. The processor 202 is further illustrated as including a cache 234 that is operatively connected to the memory controller 216, the OS Core 204 and the PP Core 206.

In some example embodiments, interfaces associated with each of the IOMMU 244, interrupt controller 232, and memory controller 216 are made available only to the PP Core 206 to allow the PP Core 206 to modify the functionality of the IOMMU 244, interrupt controller 232, and memory controller 216. These interfaces need the physical interfaces or Application Programming Interfaces (APIs). An example of a modified functionality includes the MMU 208, 210 directing updated descriptors to the PP-module 404 residing on the PP Core 206 from the NIC 250 and the interrupt controller 232 interrupting the PP-module 404 to perform packet processing.

Examples of methods in which packets may be processed among at least one first computing device and a second computing device will now be described with respect to the following flow diagram of the method 300 depicted in FIG. 3. It should be apparent to those of ordinary skill in the art that the method 300 represents a generalized illustration and that other steps may be added or existing steps may be removed, modified or rearranged without departing from the scope of the method 300.

The description of the method 300 is made with reference to the system 100 illustrated in FIG. 1 and the compute blade 102a illustrated in FIG. 2, and thus makes reference to the elements cited therein. It should, however, be understood that the method 300 is not limited to the elements set forth in the system 100 and compute blade 102a. Instead, it should be understood that the method 300 may be practiced by a system or compute blade having a different configuration than that set forth in the system 100 and compute blade 102a.

The computing devices referenced with respect to the method 300 may comprise cores of a common processor, multiple processors/cores of one or more compute blades, etc. Thus, in a first example, the first computing device comprises the OS Core 204 and the second computing device comprises the PP Core 206. In a second example, the first computing device comprises a first processor in a compute blade and the second computing device comprises a second processor in the same compute blade. In a third example, the first computing device comprises a processor in a first compute blade and the second computing device comprises a processor in a separate second compute blade. In the third example, another compute blade, for instance, may operate as a NIC 250.

In each the examples above, the first computing device is configured to transmit and/or receive packets through a NIC 250 and the second computing device is configured to perform packet processing operation on the packets prior to the transmission of the packets through the MC 250 and/or receipt of the packets by the first computing device. More particularly, the first computing device is configured to update device descriptor queues (transmit and receive descriptor queues) of the first computing device and the second computing device is configured to update virtualized descriptor queues (virtualized transmit and receive descriptor queues) based upon the updated device descriptor queues prior to transmission and receipt of packets through the NIC 250. In addition, the NIC 250 is configured to access the virtualized descriptor queues during transmission and receipt of the packets as described in greater detail herein below.

At step 302, the second computing device, such as the PP Core 206, receives descriptors of packets to be transmitted or received by the first computing device. The descriptors of packets are generally employed by the OS and the PP module to access the data packets stored in the OS packet buffer 222 and/or the PP memory 224. In one example, the PP Core 206 is configured to intercept the descriptors. In this example, the interception of the descriptors by the PP Core 206 may be transparent to the OS. In another example, the OS is configured to inform the PP Core 206 of the descriptors when the OS transmits or receives packets. Various manners in which the second computing device may receive the descriptors are described in greater detail herein below with respect to the following figures.

At step 304, the second computing device places the received descriptors in a virtualized descriptor queue that is accessible by the second computing device. Generally speaking, the virtualized descriptor queue of the second computing device is a virtualized version of a device descriptor queue of the OS. In addition, the NIC 250 is configured to use the virtualized descriptor queue instead of the device descriptor queue in transmitting and receiving packets. The second computing device, instead of the OS, is therefore responsible for synchronizing the virtualized descriptor queue with the descriptor queue of the first computing device.

At step 306, the second computing device processes the packets associated with the descriptors placed in the virtualized descriptor queue prior to one of transmission and receipt of the packets by the first computing device. The second computing device may perform various types of processing operations on the packets, such as, intrusion detection, malware detection, performance monitoring, traffic classification, flow management, content insertion/modification, etc.

At step 308, the second computing device may determine whether the packets require modification. Step 308 is considered optional because performance of step 308 may be limited to those instances where the second computing device is configured to manipulate or cause the packets to be manipulated based upon the processing. In other instances, such as when the second computing device is not configured to modify the packets, which include instances where the second computing device merely tracks or classifies the packets, the second computing device would not perform step 308.

In instances where the second computing device is configured to manipulate or cause the packets to be manipulated, the second computing device may determine whether the packets are to be modified at step 308. If the second computing device determines that the packets require modification, the second computing device modifies the packets as indicated at step 310. Thus, for instance, in the event that the second computing device determines that the packets contain malware, the second computing device may modify the packets by dropping the packets such that the packets do not reach the first computing device. In another example, the second computing device may modify the packets to remove detected malware.

In instances where the second computing device is not configured to manipulate the packets or when the second computing device determines that the packets do not require modification at step 308, the second computing device communicates a signal to the NIC 250 or the first computing device to copy the packets, as indicated at step 312. Various examples of mechanisms through which the NIC 250 or the first computing device are informed to copy the packets are described in greater detail herein below. In addition, or alternatively, the second computing device may send the instruction at step 312 following modification of the packets at step 310.

Through implementation of the method 300, the second computing device, such as, the PP Core 206, may relatively easily inspect the packets referenced by the descriptors in the virtualized descriptor queue. In addition, once the processing is completed, the second computing device may safely move the descriptors to the device descriptor queue. The second computing device thus interposes between the first computing device and the NIC 250. This interposition may be transparent, in terms of functionality, from the perspective of both the OS running on the first computing device and the NIC 250.

Turning now to FIGS. 4A-4D, there are shown respective diagrams 400, 420, 430, and 440 of states of a device descriptor queue 402 and a PP descriptor queue 412, which is equivalent to the virtual descriptor queue discussed above, prior to transmission of packets by an operating system (OS), according to an example. Thus, for instance, FIGS. 4A-4D depict states of the device descriptor queue 402 and the PP descriptor queue 412 during performance of a packet transmission operation (steps 302-312 in FIG. 3). Although particular reference is made herein to the OS Core 204 and the PP Core 206, it should be understood that the operations discussed herein are applicable to other computing devices, such as, processors, servers, etc. In addition, the device descriptor queue 402 in FIGS. 4A-4D may comprise a transmit descriptor queue of the first computing device and the PP descriptor queue 412 may comprise a virtualized transmit descriptor queue of the second device.

Figure 4A:
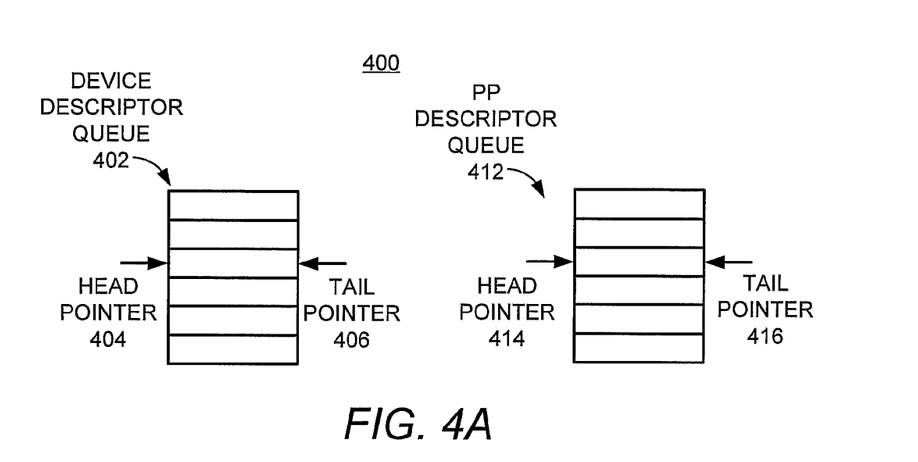
FIGS. 4A-4D, respectively, show diagrams of a device descriptor queue and a PP descriptor queue (virtual descriptor queue) at various stages during a packet transmission operation, according to an example embodiment of the invention.

As shown in FIG. 4A, the device descriptor queue 402 includes a head pointer 404 and a tail pointer 406 and the PP descriptor queue 412 includes a head pointer 414 and a tail pointer 416. FIG. 4A depicts the states of the device descriptor queue 402 and the PP descriptor queue 412 when the first computing device is not transmitting or receiving packets.

Figure 3:
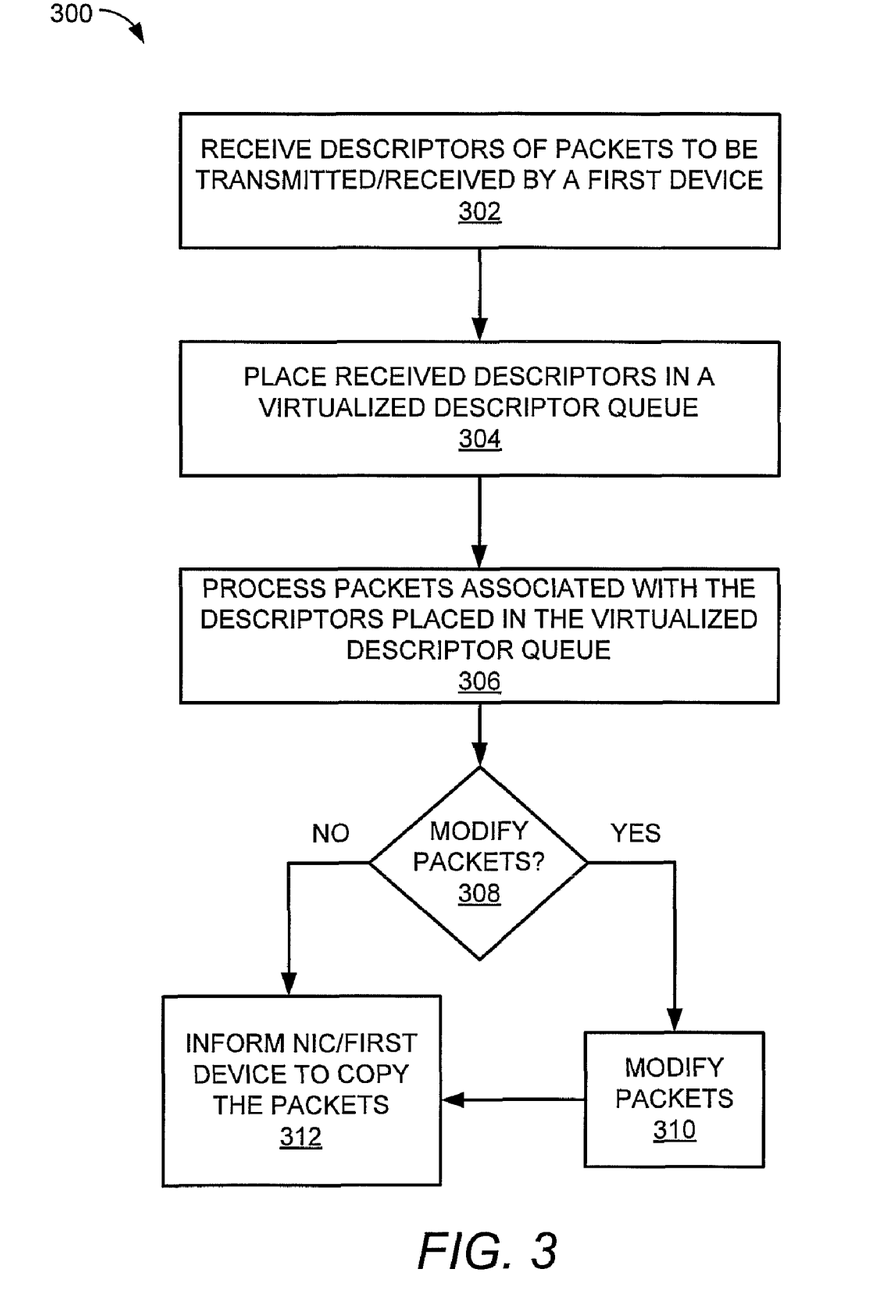
FIG. 3 illustrates a flow diagram of a method for processing packets among at least a first computing device and a second computing device, according to an example embodiment of the present invention.
Figure 4B:
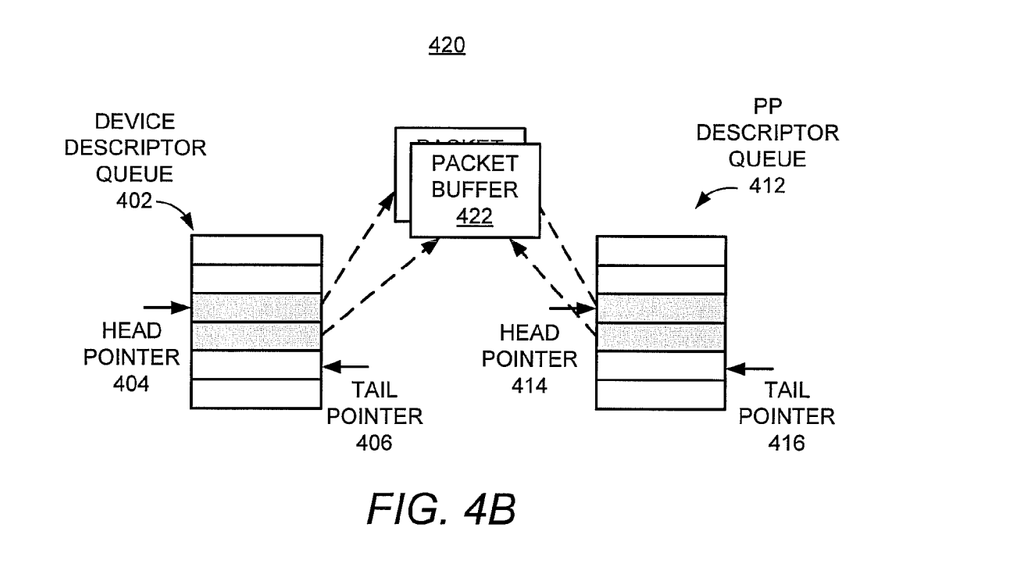

With reference now to the diagram 420 in FIG. 4B, when an OS (not shown) residing in the first computing device transmits a descriptor, the OS advances the tail pointer 406 in the device descriptor queue 402. More particularly, for instance, at step 302 (FIG. 3), the MMU 208 of the OS core 204 directs this write descriptor to a PP module (not shown) residing on the PP core 206. In addition, the interrupt controller 232 notifies the PP module that a packet is ready for processing via using an interrupt or by writing a memory mapped register. Upon notification, the PP module copies the newly posted descriptors, which are associated with packets stored in a packet buffer 422, into the PP descriptor queue 412, as noted at step 304 (FIG. 3).

Figure 4C:
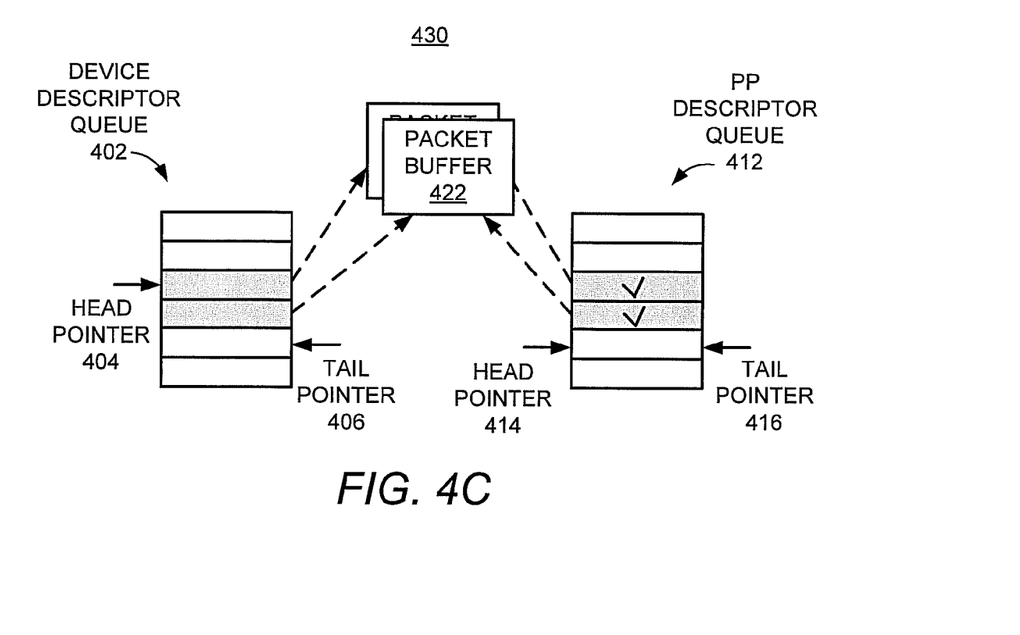

In addition, the PP module is configured to use the descriptor provided to it by the MMU 208 of the first computing device to perform packet processing on the data packet, as indicated at step 306 (FIG. 3). In some example embodiments, the PP module uses a modified NIC device driver to retrieve the descriptor. Upon completion of the packet processing at step 306, and in response to the packet being validated for transmission by the PP module (diagram 430 in FIG. 4C), a signal is sent to the NIC 250 to transmit the data packet. In addition, the NIC 250 consumes the descriptors from the PP descriptor queue 412 and marks the descriptors as completed and updates the head pointer 414 as shown in the diagram 430 (FIG. 4C). In some example embodiments, the packet processing and the sending of the data packet to the NIC 250 occur synchronously with the operations of the NIC 250 and the OS.

Figure 4D:
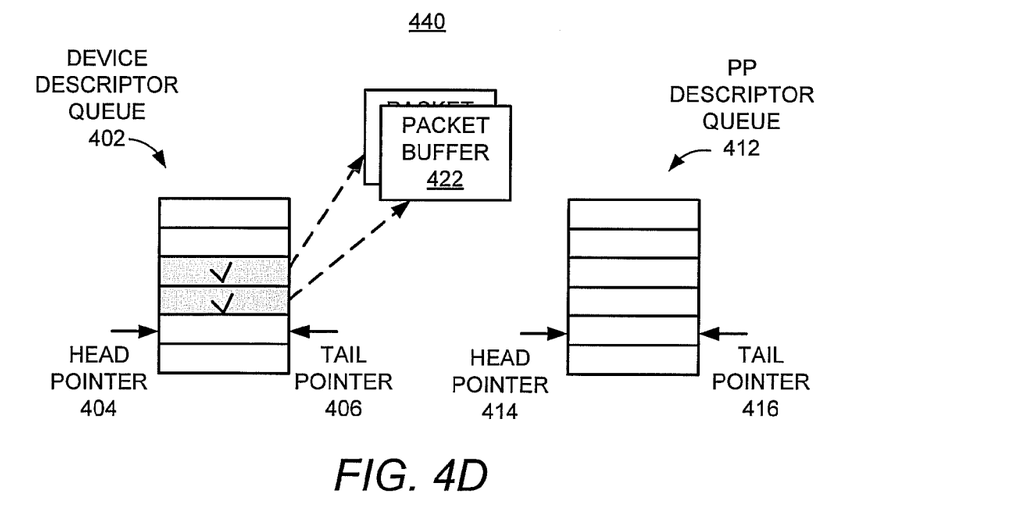

As shown in the diagram 440 in FIG. 4D, the PP module 404 copies the completed descriptors to the device descriptor queue 402 and updates the head pointer 404 in the device descriptor queue 402. In addition, the OS may clean the device descriptor queue 402.

Turning now to FIGS. 5A-5D, there are shown respective diagrams 500, 520, 530, and 540 of states of a device descriptor queue 402 and a PP descriptor queue 412, which is equivalent to the virtual descriptor queue discussed above, prior to receipt of packets by an operating system (OS), according to an example. Thus, for instance, FIGS. 5A-5D depict states of the device descriptor queue 402 and the PP descriptor queue 412 during performance of a packet receipt operation (steps 302-312 in FIG. 3). Although particular reference is made herein to the OS Core 204 and the PP Core 206, it should be understood that the operations discussed herein are applicable to other computing devices, such as, processors, servers, etc. In addition, the device descriptor queue 402 in FIGS. 5A-5D may comprise a receipt descriptor queue of the first computing device and the PP descriptor queue 412 may comprise a virtualized receipt descriptor queue of the second device.

Figure 5A:
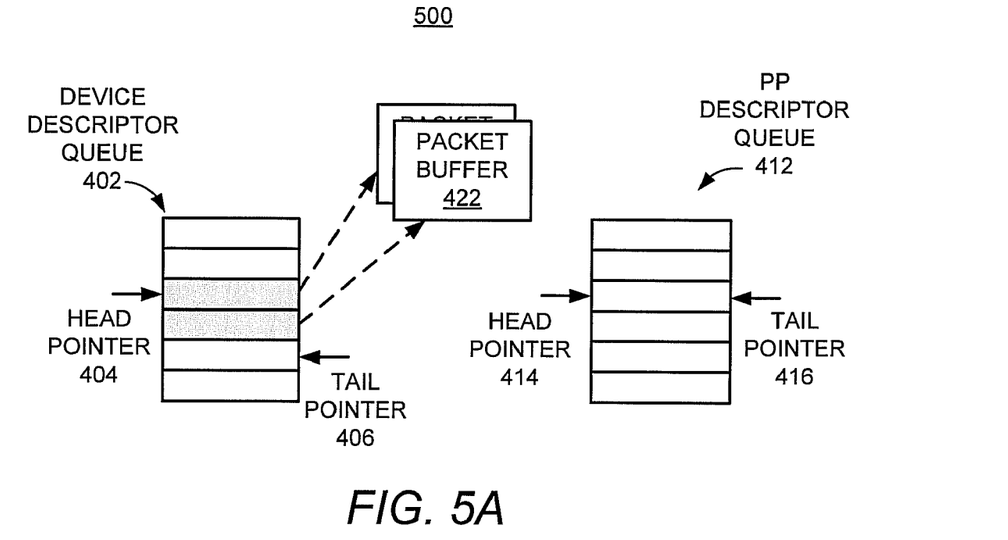
FIGS. 5A-5D, respectively, show diagrams of a device descriptor queue and a PP descriptor queue (virtual descriptor queue) at various stages during a packet receiving operation, according to an example embodiment of the invention.

As shown in the diagram 500 in FIG. 5A, the OS makes descriptors available in the device descriptor queue 402 by increasing the OS tail pointer 406, which prepares empty buffers for packets that will arrive in the future. Further, for instance, the NIC 250 transmits an updated descriptor referencing the location of the stored data packet 602 to the MMU 210 of the PP core 206. As used herein, an update descriptor denotes a pointer or referent to an address in an OS buffer 422 and a size of the OS buffer in which is stored a data packet. In some example embodiments, the update descriptor describes the particular location of the data packet in the OS buffer. The MMU 210 of the PP core 206 detects the updated descriptor and directs it to the PP module. This updated descriptor may be stored in the PP memory 224, for instance at steps 302 and 304 in FIG. 3. An interrupt is generated by the interrupt controller 232 to allow the PP module to perform packet processing on the data packet referenced by the update descriptor (step 306, FIG. 3).

Figure 5B:
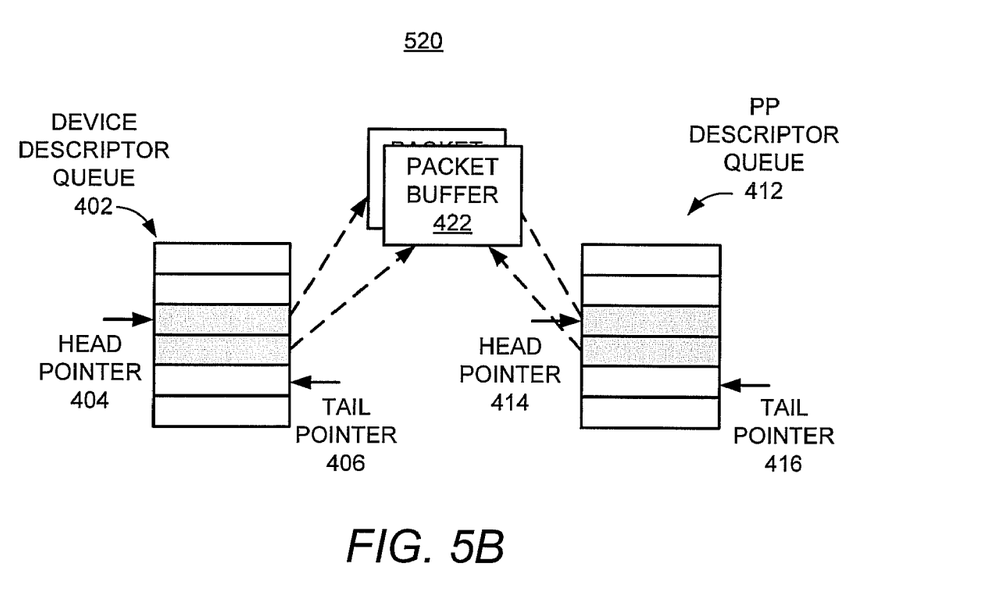
Figure 5C:
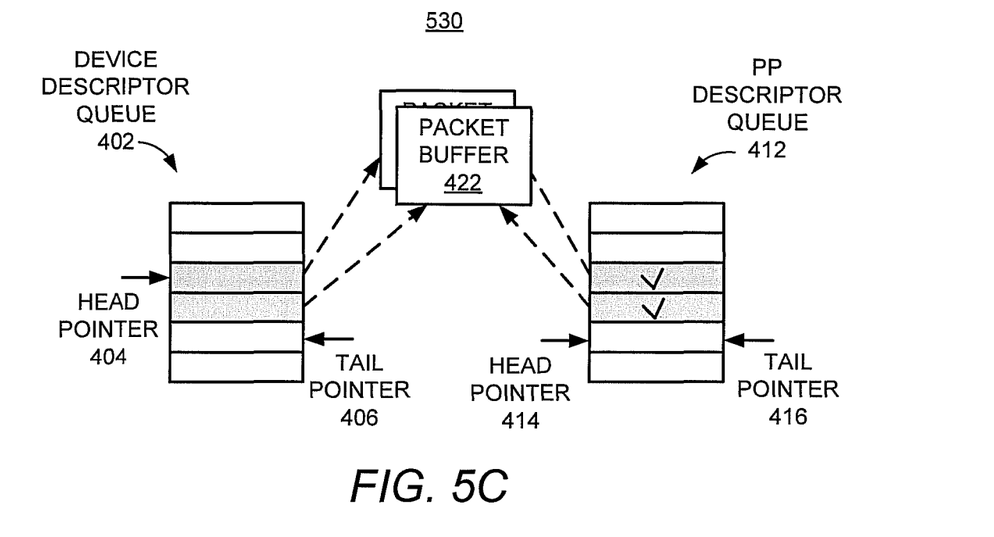

As shown in the diagram 520 in FIG. 5B, the PP module updates the tail pointer 416 in the PP descriptor queue 412 corresponding to the update in the tail pointer 406 of the device descriptor queue 402 (step 304, FIG. 3). In addition, with reference to the diagram 530 in FIG. 5C, the NIC 250 copies the received packets and descriptors and marks the descriptors in the PP descriptor queue 412 as being completed. Moreover the NIC 250 updates the head pointer 414 in the PP descriptor queue 412 (step 312). The PP module is configured to use the descriptor provided to it by the MMU 210 to perform packet processing on the data packet, as indicated at step 306 (FIG. 3). Upon completion of the packet processing at step 306, and in response to the packet being validated for receipt by the OS, the updated descriptor is sent by the PP module to the OS requesting that the data packet be processed. In some example embodiments, the interrupt may be an extra inter-processor interrupt. As with the sending of the data packet, the receiving of the data packet may occur synchronously with the operations of the NIC 250 and OS 402.

Figure 5D:
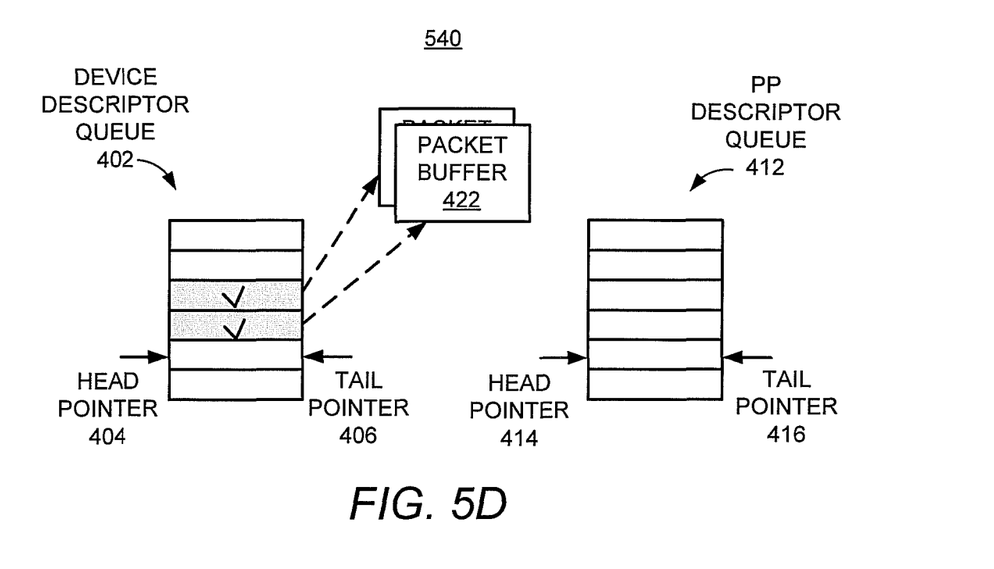

As shown in the diagram 540 in FIG. 5D, the PP module copies the completed descriptors to the device descriptor queue 402 and updates the head pointer 404 in the device descriptor queue 402. In addition, the OS may consume the packets and may clean the device descriptor queue 402.

Some or all of the operations set forth in the figures may be contained as a utility, program, or subprogram, in one or more computer readable storage mediums. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage devices include conventional computer system random access memory (RAM), read-only memory (ROM), erasable programmable read-only memory (EPROM), electrically erasable programmable read-only memory (EEPROM), and magnetic or optical disks or tapes. Concrete examples of the foregoing include distribution of the programs on a compact disc read only memory (CD ROM) or via Internet download. It is therefore to be understood that any electronic device capable of executing the above-described functions may perform those functions enumerated above.

Figure 6:
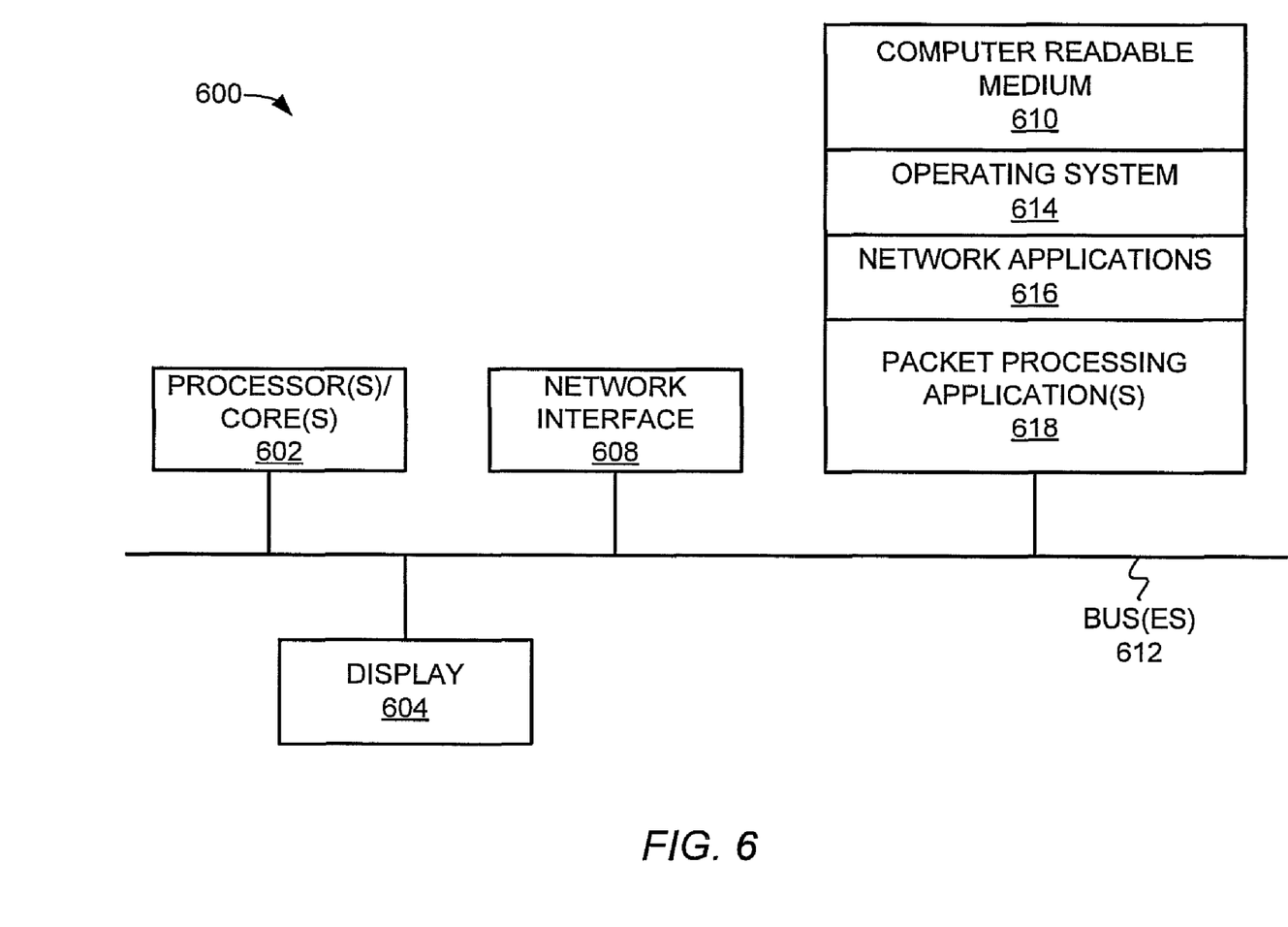
FIG. 6 illustrates a block diagram of a computer apparatus configured to implement or execute one or more of the processes depicted in FIG. 3, according to an example embodiment of the present invention.

FIG. 6 illustrates a block diagram of a computing apparatus 600, such as the compute blade 102a depicted in FIG. 2, according to an embodiment. It should be understood that the illustration of the computing apparatus 600 is a generalized illustration and that the computing apparatus 600 may include additional components and that some of the components described may be removed and/or modified without departing from the scope of the computing apparatus 600.

The computing device 600 includes one or more processors, each of which includes one or more cores 602, such as a central processing unit; one or more display devices 604, such as a monitor; one or more network interfaces 608, such as a Local Area Network LAN, a wireless 802.11x LAN, a 3G mobile WAN or a WiMax WAN; and one or more computer-readable mediums 610. Each of these components is operatively coupled to one or more buses 612. For example, the bus 612 may be an EISA, a PCI, a USB, a FireWire, a NuBus, or a PDS.

The computer readable medium 610 may be any suitable medium that participates in providing instructions to the processor(s)/core(s) 602 for execution. For example, the computer readable medium 610 can be non-volatile media, such as an optical or a magnetic disk; volatile media, such as memory; and transmission media, such as coaxial cables, copper wire, and fiber optics. Transmission method can also take the form of acoustic, light, or radio frequency waves.

The computer-readable medium 610 may also store an operating system 614, such as Mac OS, MS Windows, Unix, or Linux; network applications 616; and one or more packet processing application(s) 618. The operating system 614 may be multi-user, multiprocessing, multitasking, multithreading, real-time and the like. The operating system 614 may also perform basic tasks such as recognizing input from input devices, such as a keyboard or a keypad; sending output to the display 604; keeping track of files and directories on the computer readable medium 610; controlling peripheral devices, such as disk drives, printers, image capture device; and managing traffic on the one or more buses 612. The network applications 616 includes various components for establishing and maintaining network connections, such as software for implementing communication protocols including TCP/IP, HTTP, Ethernet, USB, and FireWire.

The packet processing application(s) 618 provides various software components for receiving descriptors, processing packets associated with the descriptors, updating descriptor queues, and modifying packets as needed, as described above. In certain embodiments, some or all of the processes performed by the application 618 may be integrated into the operating system 614. In certain embodiments, the processes can be at least partially implemented in digital electronic circuitry, or in computer hardware, firmware, software, or in any combination thereof.

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for processing packets among at least a first computing device and a second computing device, wherein the first computing device is configured to transmit and receive packets through a Network Interface Card (NIC), said method comprising:
   in the first computing device,
   initiating a transmission of packets by moving a tail pointer in a device descriptor queue of the first computing device to provide space for descriptors of packets to be transmitted to the second computing device;
   notifying the second computing device the descriptors of packets are ready for processing prior to in the second computing device receiving the descriptors of the packets;
   in the second computing device, receiving descriptors of packets to be one of transmitted and received by the first computing device through a device descriptor queue in response to a determination that a tail pointer in the device descriptor queue of the first computing device has been moved;
   placing the received descriptors in a virtualized descriptor queue accessible by the second computing device; and
   processing the packets associated with the descriptors placed in the virtualized descriptor queue prior to one of transmission and receipt of the packets by the first computing device.

2. The method according to claim 1, further comprising:
   at least one of detecting intrusions, inserting content, monitoring performance, classifying traffic, managing flow, modifying content, and dropping content from the packets.

3. The method according to claim 1, wherein the first computing device is configured to manipulate positions of a head pointer and the tail pointer in the device descriptor queue prior to transmitting and receiving the packets.

4. The method according to claim 3, further comprising:
   wherein receiving the descriptors of the packets further comprises moving a tail pointer in the virtualized descriptor queue accessible by the second computing device to provide space for the descriptors of the packets to be transmitted.

5. The method according to claim 4, said method further comprising:
   in the NIC,
   transmitting the packets associated with the descriptors contained in the virtualized descriptor queue following completion of the processing of the packets; and
   updating a head pointer of the virtualized descriptor queue to signify that the packets have been transmitted.

6. The method according to claim 5, said method further comprising: in the second computing device, copying completed descriptors to the device descriptor queue and updating the head pointer of the device descriptor queue.

7. The method according to claim 3, wherein receiving descriptors of packets to be one of transmitted and received by the first computing device through the device descriptor queue further comprises:
   initiating a reception of the packets by the first computing device, wherein initiation of the reception includes moving the tail pointer in the device descriptor queue to provide space for the descriptors of the packets to be received by the second computing device.

8. The method according to claim 7, wherein receiving the descriptors of the packets further comprises moving a tail pointer in the virtualized descriptor queue accessible by the second computing device to provide space for the descriptors of the packets to be received.

9. The method according to claim 8, said method further comprising:
   in the NIC,
   receiving the packets associated with the descriptors contained in the virtualized descriptor queue and marking the descriptors in the virtualized descriptor queue as being completed; and
   updating a head pointer of the virtualized descriptor queue to signify that the packets have been received.

10. The method according to claim 9, said method further comprising:
    in the second computing device, copying completed descriptors to the device descriptor queue and updating the head pointer of the descriptor queue.

11. A system for processing packets, the system comprising:
    a first computing device configured to:
    transmit and receive packets through a Network Interface Card (NIC), the first computing device being configured to manipulate positions of a head pointer and a tail pointer in a device descriptor queue;
    initiate a transmission of the packets including the first computing device by moving the tail pointer in the device descriptor queue to provide space for the descriptors of the packets to be transmitted and a second computing device moving the tail pointer of the virtualized descriptor queue to receive the descriptors of the packets;

notify the second computing device the descriptors of packets are ready for processing;

the second computing device configured to:

receive descriptors of packets to be one of transmitted and received by the first computing device in response to a determination a tail pointer in the device descriptor queue of the first computing device has been moved;

place the received descriptors in a virtualized descriptor queue accessible by the second computing device; and process the packets associated with the descriptors placed in the virtualized descriptor queue prior to one of transmission and receipt of the packets by the first computing device.

12. The system according to claim 11, wherein the second computing device is configured to process the packets to at least one of detect intrusions, insert content, monitor performance, classify traffic, manage flow, modify content, and drop content from the packets.

13. The system according to claim 11, wherein the first computing device and the second computing device comprise cores in a common processor.

14. The system according to claim 11, wherein the first computing device and the second computing device comprise processors in at least one compute blade.

15. The system according to claim 11, wherein the first computing device is configured to:

initiate a reception of the packets, wherein initiation of the reception includes moving the tail pointer in the device descriptor queue to provide space for the descriptors of the packets to be received, and wherein the second computing device is further configured to move a tail pointer of the virtualized descriptor queue to receive the descriptors of the packets contained in the device descriptor queue.

16. At least one non-transitory computer readable storage medium on which is embedded one or more computer programs, said one or more computer programs implementing a method for processing packets among at least a first computing device and a second computing device, wherein the first computing device is configured to transmit and receive packets through a Network Interface Card (NIC), said one or more computer programs comprising a set of instructions for:

in the first computing device, initiating a transmission of the packets by the first computing device by moving a tail pointer in the device descriptor to provide space for the descriptors of the packets to be transmitted to the second computing device; and notifying the second computing the device descriptors of packets are ready for processing;

in the second computing device, receiving descriptors of packets to be one of transmitted and received by the first computing device through a device descriptor queue in response to a determination that a tail pointer in the device descriptor queue of the first computing device has been moved;

placing the received descriptors in a virtualized descriptor queue accessible by the second computing device; and processing the packets associated with the descriptors placed in the virtualized descriptor queue prior to one of transmission and receipt of the packets by the first computing device.

17. The at least one non-transitory computer readable storage medium according to claim 16, wherein the instructions for receiving descriptors of packets in the second computing device, said one or more computer programs further comprises a set of instructions for:

initiating a reception of the packets by the first computing device, wherein initiation of the reception includes the first computing device moving a tail pointer in the device descriptor queue by the first computing device to provide space for the descriptors of the packets to be received by the second computing device.

* * * * *

UNITED STATES PATENT AND TRADEMARK OFFICE
CERTIFICATE OF CORRECTION

| | |
|---|---|
| PATENT NO. | : 8,396,953 B2 |
| APPLICATION NO. | : 12/723168 |
| DATED | : March 12, 2013 |
| INVENTOR(S) | : Matteo Monchiero et al. |

It is certified that error appears in the above-identified patent and that said Letters Patent is hereby corrected as shown below:

In the Claims:

In column 12, line 13, in Claim 16, delete "computing the device descriptors" and insert -- computing device the descriptors --, therefor.

Signed and Sealed this
Thirteenth Day of August, 2013

Teresa Stanek Rea
*Acting Director of the United States Patent and Trademark Office*